United States Patent
Cho

(10) Patent No.: US 7,460,881 B2
(45) Date of Patent: Dec. 2, 2008

(54) SPEAKER POSITION OPTIMIZING DEVICE FOR MOBILE COMMUNICATION TERMINAL AND METHOD THEREOF

(75) Inventor: A-Seo Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 544 days.

(21) Appl. No.: 11/296,365

(22) Filed: Dec. 8, 2005

(65) Prior Publication Data

US 2006/0128442 A1 Jun. 15, 2006

(30) Foreign Application Priority Data

Dec. 9, 2004 (KR) .................. 10-2004-0103831

(51) Int. Cl.
*H04Q 7/20* (2006.01)
*H04M 1/00* (2006.01)

(52) U.S. Cl. .............. 455/550.1; 455/456.1; 455/569.1; 455/575.1; 455/350; 379/433.02; 381/328

(58) Field of Classification Search ............. 455/456.1, 455/456.6, 41.1–41.3, 575.1, 550.1, 569.1, 455/350; 381/328, 379–380; 379/433.02
See application file for complete search history.

(56) References Cited

U.S. PATENT DOCUMENTS

| | | | |
|---|---|---|---|
| 6,853,850 B2 * | 2/2005 | Shim et al. | 455/550.1 |
| 2005/0049018 A1 * | 3/2005 | Chiang et al. | 455/575.1 |
| 2005/0196009 A1 * | 9/2005 | Boesen | 381/380 |
| 2005/0221867 A1 * | 10/2005 | Zurek et al. | 455/569.1 |

* cited by examiner

*Primary Examiner*—Simon D Nguyen
(74) *Attorney, Agent, or Firm*—Birch, Stewart, Kolasch & Birch, LLP

(57) ABSTRACT

A mobile communication terminal including a detecting unit configured to detect positional information corresponding to a location of a speaker of the mobile terminal relative to a user's ear canal, and a controlling unit configured to move the speaker relative to the user's ear canal based on the positional information detected by the detecting unit.

18 Claims, 3 Drawing Sheets

SPEAKER POSITION OPTIMIZING DEVICE FOR MOBILE COMMUNICATION TERMINAL AND METHOD THEREOF

This application claims priority to Korean Application No. 10-2004-0103831 filed in Korea on Dec. 9, 2004, the entire contents of which is hereby incorporated by reference in its entirety.

BACKGROUND OF THE INVENTION

1. Field of the Invention

The present invention relates to a mobile communication terminal, and more particularly to a speaker position optimizing device and corresponding method for a mobile communication terminal that optimizes the position of the speaker based on a detected position of the speaker relative to the user's ear canal.

2. Description of the Background Art

Mobile terminal service providers such as SPRINT, VERIZON, etc. provide the mobile user with a variety of communication functions. For example, the service providers provide communication functions such as wireless Internet access, video on demand (VoD) services, text and multimedia message transmission capabilities, wireless on-line games, etc. Also, mobile terminal manufacturing companies such as LG (the assignee of the present invention) provide the mobile terminal user with a variety of non-communication functions such as allowing the user to take pictures with a camera, listen to MP3s, use a memo pad, perform scheduling tasks, or provide the user with a wake-up call, etc.

Further, the mobile terminal includes a speaker for outputting sound data such as an MP3 file, etc., and a microphone for receiving and converting a received voice signal into a demodulated digital signal and transmitting the signal to an intended user. The mobile terminal also includes a receiver for receiving a call from another user and converting the received signal into an analog voice signal. The received call is then output via a speaker associated with the receiver. Thus, the user places the speaker near his or her ear to listen to the received voice signal. In addition, the user may then speak into the microphone, which demodulates the input voice data and transmits it to the other user.

However, the related art speaker has the following problems. Because the related art speaker is fixed at a certain position on the mobile terminal, the user has to hold the mobile terminal near their ear in the same position to properly hear the voice signal output from the speaker. However, during this process, the speaker may not be properly aligned with the user's ear canal causing the user to continually adjust the position of the terminal with respect to his or her ear.

BRIEF DESCRIPTION OF THE INVENTION

Accordingly, one object of the present invention is to address the above noted and other problems.

Another object of the present invention is to effectively control the position of the speaker for outputting a received call.

To achieve these and other advantages and in accordance with the purpose of the present invention, as embodied and broadly described herein, the present invention provides a novel mobile communication terminal. The mobile terminal according to one aspect of the present invention includes a detecting unit configured to detect positional information corresponding to a location of a speaker of the mobile terminal relative to a user's ear canal, and a controlling unit configured to move the speaker relative to the user's ear canal based on the positional information detected by the detecting unit.

According to another aspect, the present invention provides a wireless terminal including a speaker configured to output a sound signal, a detector configured to detect information corresponding to an ear canal of a user using the wireless terminal, and a rotating mechanism configured to automatically rotate the speaker to a new position based on the information detected by the detecting unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
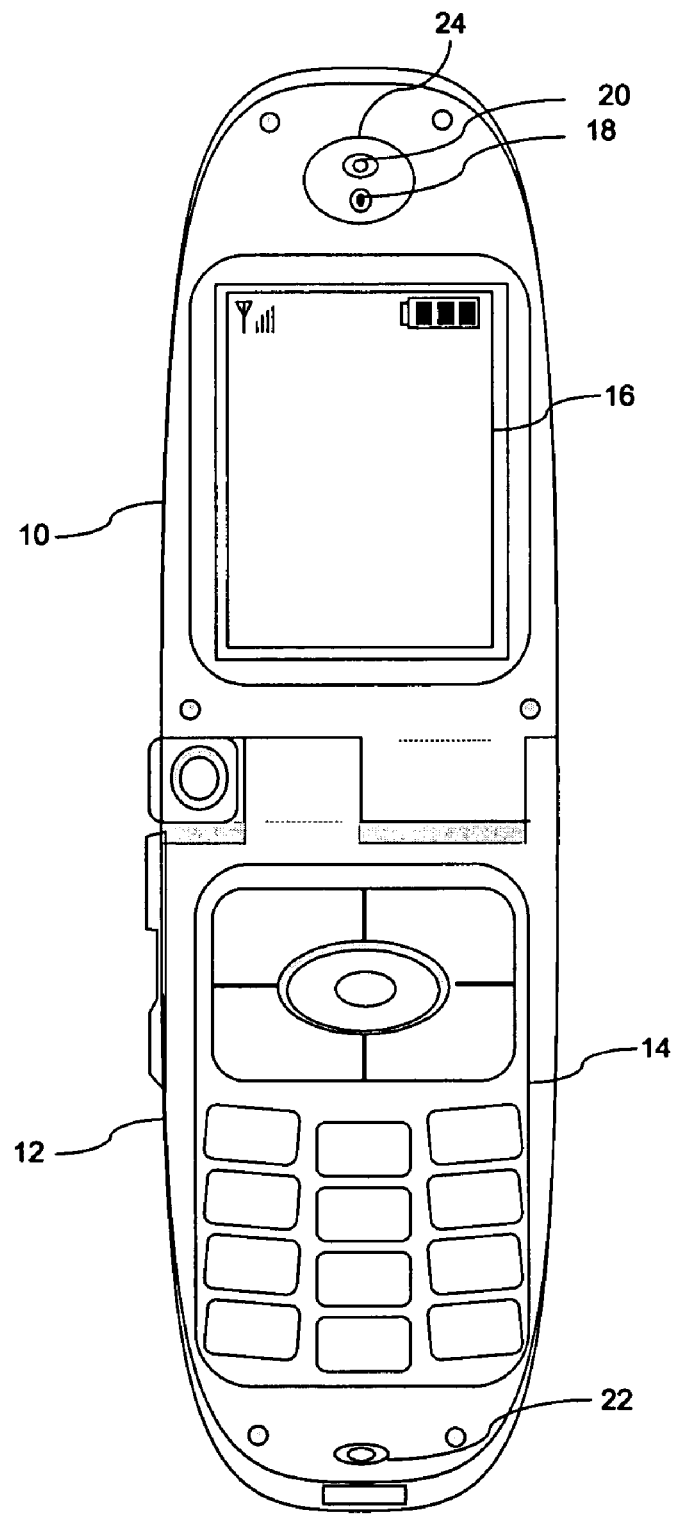
FIG. 1 is a perspective view showing a position of a speaker for a mobile communication terminal in accordance with one embodiment of the present invention.

FIG. 1 illustrates a mobile terminal in accordance with one embodiment of the present invention. As shown, the mobile terminal includes a main body 12, a display module 16, and a cover or folder 10. FIG. 1 also illustrates a detecting unit 18, a speaker 20 and a microphone 22. The detecting unit 18 detects a position of the speaker 20 relative to the user's ear canal, and the speaker 20 outputs a received voice call. That is, a receiver (not shown) receives a voice call from another user, demodulates the received voice call and outputs the demodulated voice call via the speaker 20. The user may then respond via the microphone 22, which converts the user's voice into digital data and transmit the digital data to the other user. Also illustrated is a rotating plate 24 that is rotated to position the speaker 20 at different positions.

Figure 2:
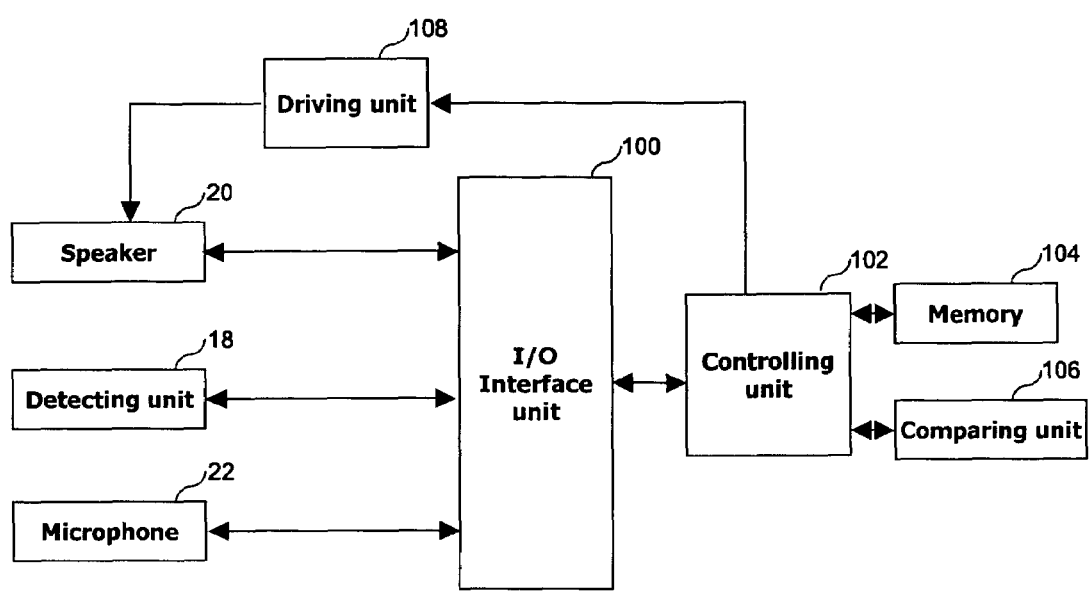
FIG. 2 is a block diagram showing a speaker position optimizing device in accordance with one embodiment of the present invention.

Turning next to FIG. 2, which is a block diagram showing a speaker position optimizing device included in a mobile terminal in accordance with one embodiment of the present invention. As shown, the optimizing device includes the detecting unit 18 for detecting a position of user's ear canal with respect to the speaker 20, a controlling unit 102 for extracting a characteristic parameter about the user's ear canal and comparing the extracted characteristic parameter with a standard characteristic parameter related to a standard ear canal, and a memory 104 for storing the extracted characteristic parameter.

Also included is a comparing unit 106 for comparing the characteristic parameter with the standard characteristic parameter stored in the memory 104, the speaker 20 for outputting a received voice call, and a driving unit 108 for moving or rotating the speaker 20 based on instructions from the controlling unit 102. The detecting unit 18 may be a distance measuring sensor, an image recognizing sensor, a temperature measuring sensor, etc. Further, as shown in FIG. 2, communication is provided between the controlling unit 102, the speaker 20, detecting unit 18 and microphone 22 via an Input/Output (I/O) interface 102.

An operation of the device for optimizing a position of the speaker 20 will now be explained with reference to FIGS. 1 and 2.

As noted above, the detecting unit 18 may be a distance measuring sensor, an image recognizing sensor, temperature measuring sensor, etc. In the following explanation of the operation of the optimizing device, the detecting unit 18 is assumed to be a distance measuring device, which measures a distance from the detecting unit 18 to the user's ear canal. The detecting unit 18 may detect the distance from the detecting unit 18 to the user's ear canal by, for example, emitting an electromagnetic wave and measuring a reflected wave to determine the distance. Other detecting methods may also be used. For example, an image of the user's ear canal may be captured and then compared with a standard image of an ear canal to determine the location of the speaker 20 with respect to the user's ear canal.

In addition, because the temperature of a person's ear canal is substantially higher than other areas (e.g., a temperature of a person may be taken using a thermometer placed in the ear canal), a temperature measuring sensor may also be used as the detecting unit 18. The detected temperature may then be used to determined the location of the ear canal. For example, if the measured temperature corresponds with a predetermined temperature for a standard person's ear canal, it can be determined the location of the speaker 20 is near the ear canal, and thus the position of the speaker 20 does not have to be changed.

Thus, in accordance with one embodiment of the present invention, when the user receives a call or wants to place a call, he or she places the speaker 20 near their ear. The detecting unit 18 then measures the distance to the user's ear canal and sends the measured value to the controlling unit 102 through the I/O interface unit 100. The controlling unit 102 then transmits the measured distance to the comparing unit 106, which compares the measure distance value with a standard distance value stored in the memory 104.

In addition, the standard distance value stored in the memory 104 may be a predetermined value related to a general user or may be an average value of the particular user using the mobile terminal. In the latter instance, the current measured distance value measured by the detecting unit 18 may be used to update the average value stored in the memory 104.

The comparing unit 106 then transmits a difference value between the two values to the controlling unit 102. Using this difference value, the controlling unit 102 controls the driving unit 108 to rotate to the speaker 20 to an optimum position. For example, FIG. 1 illustrates the speaker 20 being in an upper portion. However, the controlling unit 102 may instruct the driving unit 108 to rotate the rotating plate 24 forty-five degrees so the speaker 20 is positioned on the right side of the rotating plate 24. The rotating plate 24 may be rotated via an electric motor or other method. The rotating plate may also be rotated in any direction to place the speaker 20 in the optimum position with respect to the user's ear canal.

Figure 3:
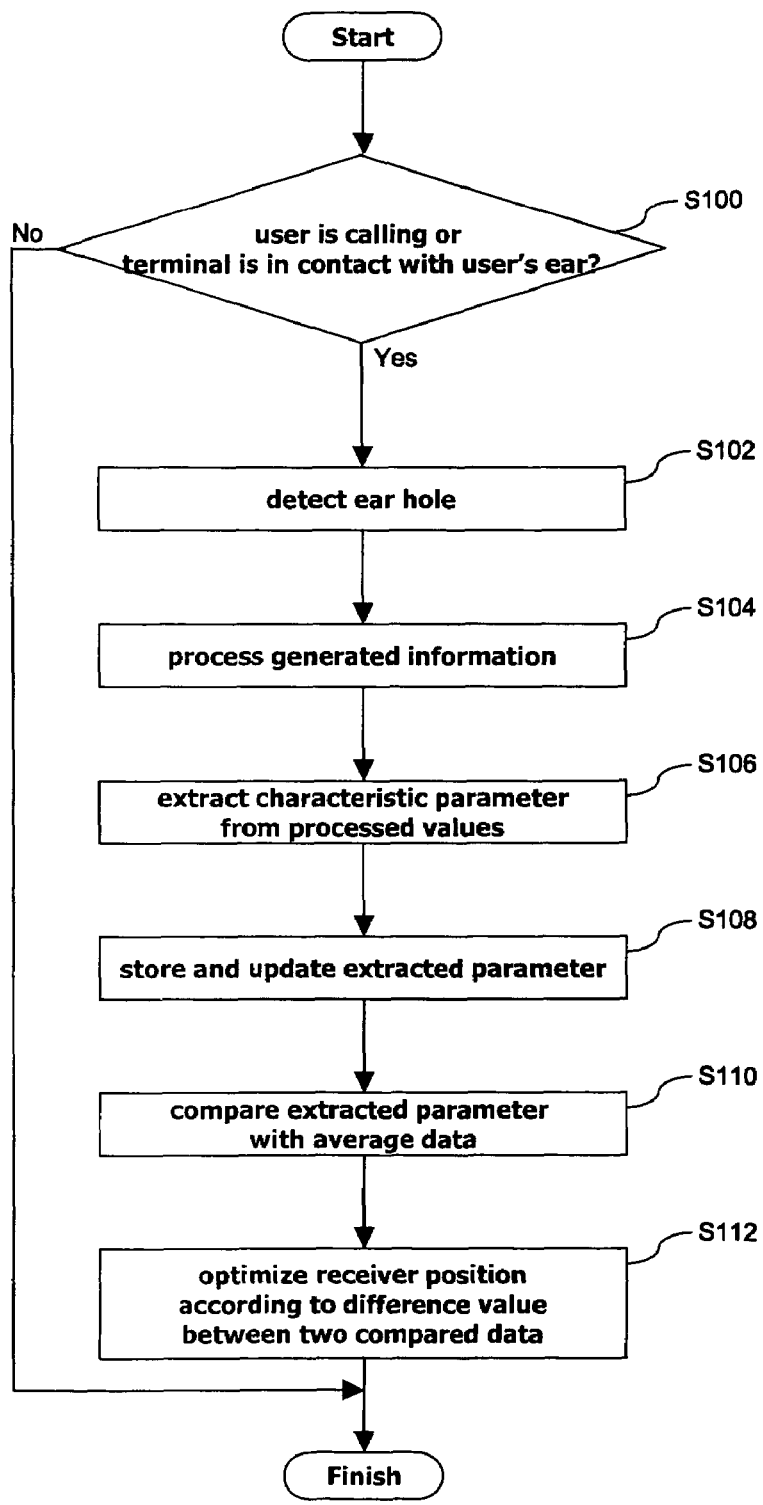
FIG. 3 is a flowchart showing a method for optimizing a position of a speaker for a mobile communication terminal in accordance with one embodiment of the present invention.

The above-noted features will now be described in more detail with respect to the flowchart shown in FIG. 3. As shown in FIG. 3, when the user initiates a call, receives a call, or places the speaker 20 near his or her ear (Yes in S100), the detecting unit 18 detects information about the user's ear canal (S102). The detected information may be a measured distance from the detecting unit 18 to the user's ear canal. Alternatively, the measured information may be an analog image of the user's ear canal. In this instance, a thresholding method may be used to convert the analog image into a digital image and a noise reduction method may be used to filter the digital image (S104).

The controlling unit 102 then extracts a characteristic parameter for optimizing a position of the speaker 20 from the processed values (S106). Further, because the characteristic parameter is used to determine the optimum position of the speaker 20, the characteristic parameter is extracted precisely by reducing an error range using the thresholding and filtering methods discussed above.

The controlling unit 102 then stores the characteristic parameter in the memory 104. The determined characteristic parameter may also be used to update an average value stored in the memory 104 (S108). The average value and real-time determined characteristic parameter are then transmitted to the comparing unit 106, which compares the two values to determine how closely the detected position is with an average position (S112). For example, based on the compared value, the controlling unit 102 may determine that the speaker 20 is too far above the user's ear canal. In this example, the controlling unit 102 controls the driving unit 108 to rotate the rotating plate 24 so the speaker 20 is at the lower portion thereof. That is, the controlling unit 102 optimizes the location of the speaker 20 with respect to the location of the user's ear canal in real-time.

Further, in one of the above-described examples, the detecting unit 108 measures a distance between the speaker 20 and the user's ear canal. In this example, the detecting unit 18 may be a distance measuring sensor provided within the mobile terminal. The measured distance is then used to rotate the speaker 20 to an optimum position such as closer to or farther from the user's ear canal. Further, the detecting unit 18 detects a distance, for example, between itself and the user's ear canal. However, because the distance between the speaker 20 and the detecting unit 18 is also known, the detecting unit 18 may conveniently determine the distance between the speaker 20 and the user's ear canal. Further, the above-described optimization process may be performed when the user is making a call or when the user is simply listening to voice messages etc. Also, if the detecting unit 18 is close to the speaker 20, the distance from the detecting unit 18 to the user's ear canal would be substantially the same as the distance from the speaker 20 to the ear canal.

Alternatively, the detecting unit 18 may be an image recognizing sensor, which produces an image of the user's ear canal and surrounding areas. The produced image may then be compared with an image of an average user to determine the optimum position for the speaker 20. For example, a comparison of the image produced in real-time and the image of the average user's ear may indicate the speaker is too far left of the user's ear canal. Thus, the controlling unit 102 would control the driving unit 108 to rotate the rotating plate 24 180 degrees so the speaker 20 is lined up with the user's ear canal.

In addition, the rotating plate 24 is shown in FIG. 1 as having a circular shape. However, other configurations may be used.

Further, FIG. 1 may also be a wireless terminal used within a household or office. In more detail, the wireless terminal may include a base on which the terminal is placed. Upon receiving a phone call, the user removes the wireless terminal from the base and begins speaking to the person calling or initiates a call.

In addition, rather than moving the speaker 20 as described above, it is also possible to redirect the output voice signal in a particular direction. Alternatively, it is possible to provide a plurality of speakers as the ear piece for the terminal and then outputting sound data only to a particular set of speakers that are closest to the user's ear canal.

As aforementioned, the present invention provides a novel mobile communication terminal that optimizes the position of the speaker by detecting the user's ear canal. Therefore, the user can conveniently use the mobile terminal with having to continually move the mobile terminal to ensure the speaker is positioned over his or her ear canal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
    a detecting unit configured to detect positional information corresponding to a location of a speaker of the mobile terminal relative to a user's ear canal; and
    a controlling unit configured to move the speaker relative to the user's ear canal based on the positional information detected by the detecting unit.
2. The terminal of claim 1, wherein the controlling unit extracts a characteristic parameter expressing a position of the speaker relative to the user's ear canal based on the positional information detected by the detecting unit.
3. The terminal of claim 2, further comprising:
    a comparing unit configured to compare the extracted characteristic parameter with a standard characteristic parameter related to an ear canal; and
    a driving unit configured to rotate a rotating plate on which the speaker is mounted to move the speaker relative to the user's ear canal based on the compared characteristic parameters.
4. The terminal of claim 3, wherein the controlling unit instructs the driving unit to rotate the speaker to lower, left, upper and right positions on the rotating plate based on the compared characteristic parameters.
5. The terminal of claim 3, wherein the standard characteristic parameter is based on a general user's ear canal.
6. The terminal of claim 3, wherein the standard characteristic parameter is based on an average characteristic parameter of the ear canal of the user using the mobile terminal.
7. The terminal of claim 6, wherein the average characteristic parameter includes a most recent characteristic parameter extracted by the controlling unit.
8. The terminal of claim 3, further comprising:
    a memory configured to store the extracted characteristic parameter and the standard characteristic parameter.
9. The terminal of claim 3, wherein the controlling unit processes the detected positional information using a thresholding method or a noise reduction method to extract the characteristic parameter, and then transmits the extracted characteristic parameter and the standard characteristic parameter to the comparing unit.
10. The terminal of claim 1, wherein the detecting unit comprises one of a distance measuring sensor configured to measure a distance from the detecting unit to the user's ear canal, an image recognizing sensor configured to photograph an image of the user's ear canal, or a temperature sensor configured to measure a temperature of the user's ear canal.
11. A wireless terminal, comprising:
    a speaker configured to output a sound signal;
    a detector configured to detect information corresponding to an ear canal of a user using the wireless terminal; and
    a rotating mechanism configured to automatically rotate the speaker to a new position based on the information detected by the detecting unit.
12. The terminal of claim 11, wherein the speaker is disposed on a rotating plate, and the rotating mechanism rotates the rotating plate in increments of 90 degrees to position the speaker at upper, left, lower and right positions.
13. The terminal of claim 11, wherein the rotating plate is disposed on a cover or folder of the terminal.
14. The terminal of claim 11, further comprising:
    a comparing unit configured to compare the information detected by the detector with standard information related to an ear canal,
    wherein the rotating mechanism rotates the speaker based on the compared information.
15. The terminal of claim 14, wherein the standard information is based on one of a general user's ear canal or based on an average of information of the ear canal of the user using the mobile terminal that has been previously detected by the detector.
16. The terminal of claim 11, wherein the terminal comprises one of a wireless handset or a mobile terminal.
17. The terminal of claim 11, wherein the detector comprises one of a distance measuring sensor configured to measure a distance from the detector to the user's ear canal, an image recognizing sensor configured to photograph an image of the user's ear canal, or a temperature sensor configured to measure a temperature of the user's ear canal.
18. The terminal of claim 11, wherein the rotating mechanism rotates the speaker in real-time when the user is using the terminal.

* * * * *